No. 758,971. Patented May 3, 1904.

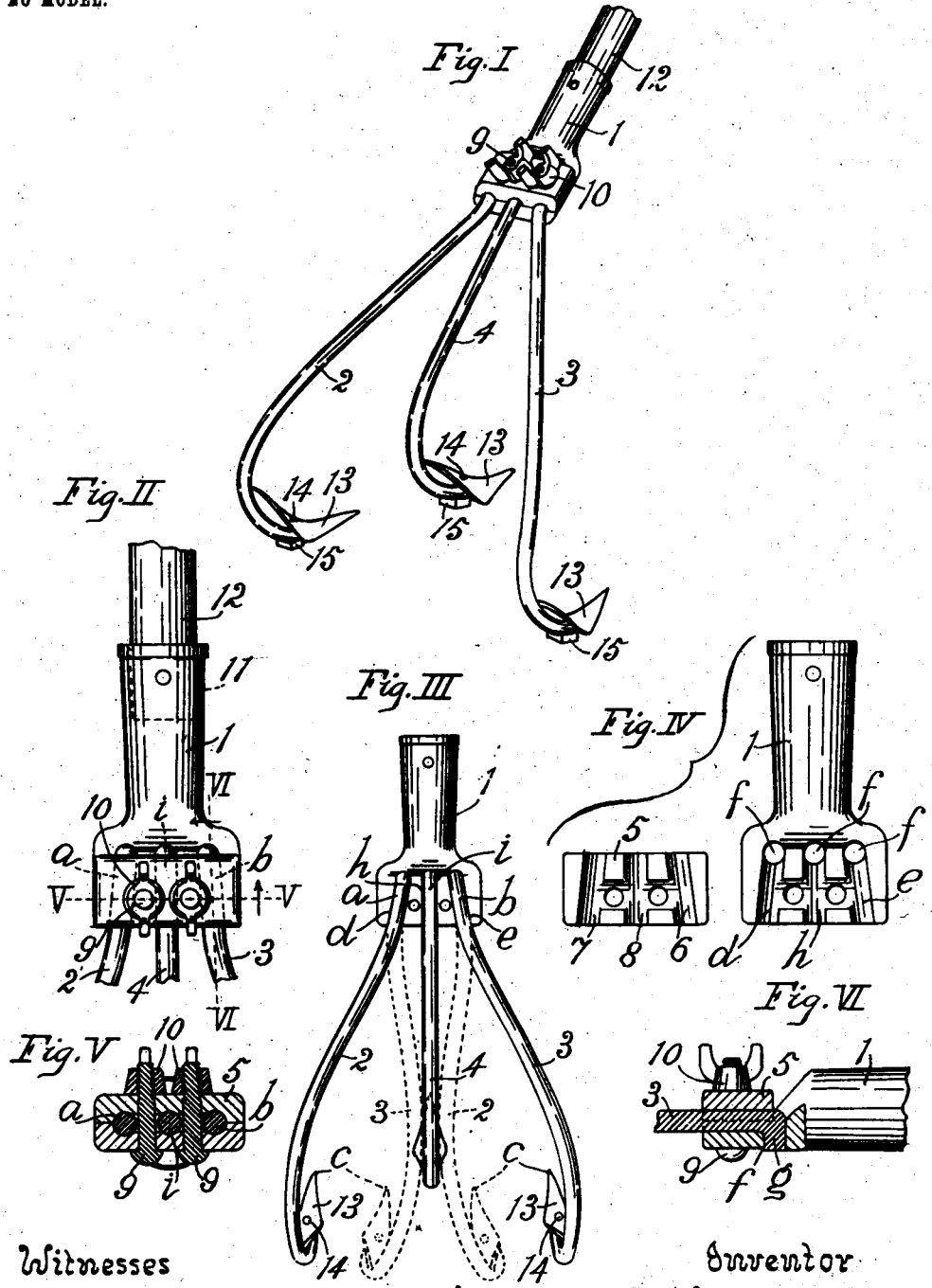

UNITED STATES PATENT OFFICE.

JAMES T. JORDAN, OF LOS ANGELES, CALIFORNIA.

CULTIVATING IMPLEMENT.

SPECIFICATION forming part of Letters Patent No. 758,971, dated May 3, 1904.

Application filed October 14, 1901. Serial No. 78,650. (No model.)

*To all whom it may concern:*

Be it known that I, JAMES T. JORDAN, a citizen of the United States, residing at Los Angeles, in the county of Los Angeles and State of California, have invented new and useful Improvements in Cultivating Implements, of which the following is a specification.

The object of this invention is to provide an attractive, compact, simple, light, and strong earth-cultivating implement which is constructed to be changed for a greater or less width of cultivation and in which the cultivator tooth or teeth may be readily detached, replaced, and renewed.

The invention is applicable in various forms, but is more especially designed for a garden-tool, in which form it is illustrated in the accompanying drawings.

Figure I is a perspective view of the cultivator applied as a garden-tool and the parts arranged to bring the teeth widely apart. Fig. II is a fragmental plan detail of the same. Fig. III is a detail showing the teeth in place before they are secured by the clamping device. Dotted lines indicate the position of the teeth when the same are arranged closely together. Fig. IV is a detail view of the tooth-carrier and the clamping-piece detached. Fig. V is a section on line V V, Fig. II. Fig. VI is a section on line VI VI, Fig. II.

1 designates a tooth-carrier. 2 3 designate teeth detachably connected with said carrier and constructed with laterally-deflected attaching portions $a$ $b$ to engage the carrier 1 at the opposite edges thereof interchangeably, whereby by transposing the teeth, as indicated by the dotted lines in Fig. III, the points $c$ thereof may be brought closer to or farther from each other, as the case may be. The carrier member 1 is provided with seats $d$ $e$ to interchangeably receive shanks $a$ and $b$ of the teeth 2 and 3. Said seats $d$ and $e$ are preferably divergent or at an angle with each other and with the axis of the carrier 1, the seats and the deflected shanks being constructed with such relation to each other as to appropriately position the points $c$ when the shanks are seated in said seats. The respective seats are preferably grooves terminating in holes $f$, respectively extending at an angle to said groove, and the shanks of the teeth are bent, as indicated as $g$, to enter said holes. The carrier 1 is preferably provided in its face with a third seat, $h$, midway between the seats $d$ and $e$ and extending coaxially of the carrier.

4 designates a middle tooth furnished with a shank $i$, seated in the seat $h$. The shank of the middle tooth is not deflected laterally, but is bent to enter the hole $f$ therefor.

5 designates a clamping-piece furnished with grooves 6 7 8, corresponding to the grooves $d$, $e$, and $h$. Suitable means are provided for holding the clamping-piece 5 in place. Bolts 9 passing through the carrier and clamping-piece and nuts 10 indicate a form of such means.

The form of carrier shown in the drawings is furnished with a socket 11, (indicated in dotted lines in Fig. II,) in which a handle 12 is fastened.

The cultivator-teeth 13 are preferably detachably connected with their respective shanks by means of bolts and nuts 14 and 15.

In practice the teeth may be readily applied and removed, and the side shanks 2 and 3 may be transposed from side to side at the pleasure of the operator to produce an implement of greater or less width. If it is desired to cultivate between narrow rows of vegetables, the teeth will be adjusted as indicated in dotted lines in Fig. III. When it is desired to cultivate with the teeth farther apart, the teeth will be adjusted as shown in solid lines.

By the grooved and hollowed arrangement shown the appliance is brought into a compact and attractive form, and great strength with minimum weight is secured. The members are hollowed, as shown, to receive the shanks and are arranged to approximately fit together, and thereby provide for the compact and attractive form shown.

What I claim, and desire to secure by Letters Patent of the United States, is—

1. A cultivator comprising a carrier member having a plurality of seats, and teeth detachably connected with said carrier member and constructed with laterally-deflected attaching portions to engage the seats of the carrier member at opposite edges thereof, interchangeably, whereby, by transposing the teeth, the points thereof may be brought closer to or farther from each other.

2. A cultivator comprising a carrier member, with a central seat and a divergent seat on each side thereof, a tooth member having a straight shank adapted to engage said central seat, and tooth members having shanks with deflected portions.

3. A cultivator comprising a carrier member formed of two clamping-pieces with divergent grooves on their adjacent faces, and tooth members having shanks held in said seats, a plurality of such tooth members having their shanks deflected to vary the position of the respective tooth members on interchanging them in the seats.

In testimony whereof I have signed my name to this specification, in the presence of two subscribing witnesses, at Los Angeles, California, this 7th day of October, 1901.

JAMES T. JORDAN.

Witnesses:
JAMES R. TOWNSEND,
JULIA TOWNSEND.